(12) United States Patent  
Eriksson

(10) Patent No.: US 8,473,616 B2
(45) Date of Patent: Jun. 25, 2013

(54) LOCATOR CODING IN A COMMUNICATIONS NETWORKS

(75) Inventor: Anders E. Eriksson, Kista (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 433 days.

(21) Appl. No.: 12/679,184

(22) PCT Filed: Sep. 20, 2007

(86) PCT No.: PCT/EP2007/059996

§ 371 (c)(1),
(2), (4) Date: May 25, 2010

(87) PCT Pub. No.: WO2009/036803

PCT Pub. Date: Mar. 26, 2009

(65) Prior Publication Data

US 2011/0107420 A1    May 5, 2011

(51) Int. Cl.
*G06F 15/16* (2006.01)

(52) U.S. Cl.
USPC ........... 709/226; 709/219; 709/238; 370/338; 370/397

(58) Field of Classification Search
USPC ........................ 709/219, 226; 370/338, 397
See application file for complete search history.

(56) References Cited

U.S. PATENT DOCUMENTS

| 5,799,063 | A | * | 8/1998 | Krane | 379/88.17 |
| 7,257,104 | B2 | * | 8/2007 | Shitama | 370/338 |
| 7,408,907 | B2 | * | 8/2008 | Diener | 370/338 |
| 7,535,870 | B2 | * | 5/2009 | Nikander et al. | 370/331 |
| 7,630,358 | B1 | * | 12/2009 | Lakhani et al. | 370/351 |
| 7,769,887 | B1 | * | 8/2010 | Bhattacharyya et al. | 709/238 |
| 7,813,346 | B1 | * | 10/2010 | Kuwabara et al. | 370/392 |

(Continued)

FOREIGN PATENT DOCUMENTS

| WO | 0157693 A | 8/2001 |
| WO | 2008028890 A | 3/2008 |

OTHER PUBLICATIONS

"Reverse Path Accumulation", IBM Technical Disclosure Bulletin, IBM Corp., New York, US, vol. 35, No. 4B, Sep. 1992, pp. 128-129.
Narten, T., et al. "RFC 3041: Privacy Extensions for Stateless Address Autoconfiguration in IPv6", IETF Request for Comments, Jan. 1, 2001, pp. 1-17.

(Continued)

*Primary Examiner* — Wing F Chan
*Assistant Examiner* — Tesfay Yohannes
(74) *Attorney, Agent, or Firm* — Rothwell, Figg, Ernst & Manbeck, P.C.

(57) ABSTRACT

A method for use in interconnected communications networks, comprising negotiating a locally unique interface identifier between a network entity and a network such that the locally unique interface identifier differs from any interface identifier used by either of the network entity and the network; and using the locally unique interface identifier to identify an egress interface from the network entity to the network, and using the locally unique interface identifier to identify an egress interface from the network to the network entity. By using a common locally unique interface identifier between networks and network entities on a path between a source or destination network entity and a core network, a globally unique locator for the source or destination network entity can be constructed by concatenating elements derived from a plurality of negotiated common local interface identifiers between networks and network entities on the path.

5 Claims, 5 Drawing Sheets

U.S. PATENT DOCUMENTS

| | | | |
|---|---|---|---|
| 7,843,840 B2 * | 11/2010 | Vankov et al. | 709/224 |
| 2002/0099856 A1 | 7/2002 | Shitama | |
| 2003/0223361 A1 * | 12/2003 | Hussain et al. | 370/230 |
| 2006/0193332 A1 * | 8/2006 | Qian et al. | 370/397 |
| 2007/0006155 A1 * | 1/2007 | Maennel et al. | 717/124 |

OTHER PUBLICATIONS

Office Action issued in coresponding Chinese application No. 200780100725.6 on Jun. 27, 2012, and a Summary of Grounds for Rejection in English, 18 pages.

* cited by examiner

LOCATOR CODING IN A COMMUNICATIONS NETWORKS

CROSS-REFERENCE TO RELATED APPLICATION

This application is a 35 U.S.C. §371 National Phase Application from PCT/EP2007/059996, filed Sep. 20, 2007, and designating the United States.

TECHNICAL FIELD

The present invention relates to packet communications in data networks, and more particularly, to locator coding in a communication network.

BACKGROUND

Name-address management generally includes issues such as name-to-address resolution and name-address registration. Name-to-address resolution is a procedure by which a "name" of a network resource, e.g., a network node, is resolved or translated into a routable network address, i.e., a location in the network topology. Name-address registration is the corresponding registration procedure by which the name and the assigned network address of the resource are registered in the network. The name of the resource is normally known to users and typically also stays the same over relatively long periods of time.

Traditional networking architectures for the Public Switched Telephone Network (PSTN) or Internet solve the problem of connecting terminals or hosts (which can be considered as "boxes") in order to support a specific application such as telephony or WWW. To this end, traditional naming and addressing schemes employ host or network centric identities such as E.164 numbers for telephony, or Internet Protocol (IP) addresses and Uniform Resource Locators (URLs) for the Internet. However, the end user is typically interested in reaching a destination object that sits behind or within the box, such as a human being or a file, rather than communicating with the box itself. As the destination objects move to new boxes, box or network dependent identities of these objects must be updated. For example, it is an everyday experience that a person cannot be reached at the phone number registered in some semi-static directory because that directory does not track the phone that she is momentarily close to. Or a web link is broken because the target data object has been moved to another location. To address this class of problems, box-independent addressing schemes such as Telephone Number Mapping (ENUM), Session Initiation Protocol (SIP) names, and Uniform Resource Identifiers (URIs) have been developed. Using a presence or mobility mechanism, box-independent names of a destination object can then be mapped to the address of the box where the destination object is currently located. Likewise, inventory systems are used to track specific objects to a specific location.

The Domain Name System (DNS) stores and provides information associated with domain names in a distributed database in networks such as the Internet. The DNS associates domain names with many types of information, but most importantly it provides the IP address for a given domain name. DNS makes it possible to associate easy-to-remember domain names (such as ericsson.com) with hard-to-remember IP addresses. DNS is suitable for resources that rarely change their location, but is not adapted for mobility. RFC 2136 describes "Dynamic Updates in the Domain Name System" in the hope of providing better support for rapid updates of DNS, but it is still far from being suitable for keeping track of roaming resources such as mobile phones and their users.

When routing protocols for the Internet and other fixed networks were initially created, hosts were not expected to move around. Therefore, hosts are usually named by their point of attachment to the network, e.g., IP addresses. Examples of routing protocols that perform routing based on IP addresses include RIP, IS-IS, OSPF, BGP and PNNI. These are all well established technologies but have limited support for mobility and have convergence problems when network topologies change rapidly.

Traditionally, applications use IP-addresses in a way that does not allow them to change during an on-going session. To allow hosts to move without changing their IP-addresses (at least from an application perspective) mobility solutions in IP networks, such as Manet (Mobile ad hoc networks), Network Mobility (NEMO), and Mobile IP have been developed. But these are fairly complex solutions since they adapt a technology intended for fixed networks to new mobility requirements.

The Host Identity Protocol (HIP) (see IETF RFC 4423) provides a method of separating the end-point identifier and locator roles of IP addresses. It introduces a new Host Identity (HI) name space based on public keys. The public keys are typically self-generated. The HIP separation can be used to provide end-to-end connectivity over different locator domains. Even still, routing protocols under development cater to mobility of individual hosts (nodes) but do not adequately address the problems relating to mobile networks (MNs). A mobile network includes a group of many mobile hosts or other objects that move together as a group. Mobile network examples include networks located in any type of mobile vehicle, e.g., in a train, airplane, bus, ship, subway, etc., but are not limited to vehicles. All that is required is that the group of mobile objects, hosts and routers move substantially together at substantially the same time. Also, a communication satellite carrying a router is another example of a mobile network that dynamically attaches to ground stations, other communication satellites, and hosts or mobile phones. A particular mobility problem associated with mobile networks is a potentially huge number of registration or other location updates that need to be signaled and processed whenever the mobile network changes location. Such a move may cause an "update storm."

Consider for example a Public Land Mobile Network (PLMN) type of system like GSM and 3G cellular networks. Mobile host name resolution is handled via a Home Location Register (HLR) and the Visited Location Register (VLR). When a mobile host is called, a phone number (MS-ISDN) is resolved via the VLR and HLR into a corresponding E.164 address that allows the call to be routed to the mobile host, if the mobile host with the MS-ISDN has registered its current location area with the VLR. Local mechanisms are used to route the call to the specific cell in the location area in which the mobile host is currently located.

The HLR and VLR have overall good performance and security support regarding name resolution in cellular systems. But they are closely linked to the E.164 address structure and as such do not provide an open architecture for other and/or arbitrary name and address spaces. Moreover, this approach to registering a host with a centralized location register like the HLR/VLR does not function well with mobile networks. The problem is particularly acute when a large mobile network with many subnetworks or hosts roams and requires registration update signaling for every one of its subnetworks and/or hosts—a good example of an "update storm" mentioned above.

In dynamic DNS, when such a mobile network roams, each host in the mobile network must have its DNS record updated. For that situation, mobile IP requires that all home agents having hosts in the mobile network be updated. RFC 3963 describes the IETF Network Mobility (NEMO) basic support protocol that enables mobile networks to attach to different points in the Internet. The protocol is an extension of mobile IPv6 and allows session continuity for every node in the Mobile Network as the network moves. It also allows every node in the Mobile Network to be reachable while mobile around. But NEMO's distributed solution suffers from what is called "pinball routing," where all internetwork traffic must be routed between every mobility agent that has an associated mobile node or network in the path towards the destination host. As a result, tunneling overhead accumulates per radio hop, and there are potential latency problems when several mobility agents are located at different continents.

As illustrated in FIG. 1, it is known to provide a set of attachment registers 14 in a network 12, where the attachment registers perform one or more network functions. A primary function of the attachment registers is to store a locator point of an object reachable from a network. For example, Attachment Register A ($AR_A$) stores a locator point of network A 16. Information is stored in the attachment registers that establishes one or more logical links between attachment registers. In the example shown in FIG. 1, the arrows between the attachment registers 14 indicate that information stored in attachment register $AR_D$ links to attachment register $AR_C$. Similarly, information in $AR_C$ links to $AR_B$, and information in $AR_B$ links to $AR_A$. The information in these attachment registers creates a path to host D, and thus allows easy construction of a global locator to host D. By using attachment registers, a global locator can be constructed to a host attached to a network even where the network or an intermediate network changes location. Only the hosts that have ongoing communication sessions need to update their global locator.

To illustrate how a global locator may be constructed, FIG. 2 illustrates an example of four networks having locally unique interface numbers between each network. A globally unique locator for a host can be constructed by concatenating a sequence of interface numbers with a globally unique locator of an Edge Router (ER). The interface numbers are locally unique for each network. In this example, host H3 201 can be reached from the ER 202 via the symbolic address (r,2,3,2). The "r" in the address is the globally unique locator for the ER 202, and each subsequent number is a Local Interface Number (LIN) of each egress interface (that is, the exit point from one mobile network to another mobile network) that is traversed on a path from the ER 202 to H3 201. The first "2" in the address relates to the interface number from the ER 202 to Mobile Network B (MNB) 203, the subsequent "3" in the address relates to the interface number from MNB 203 to Mobile Network D (MND) 204, and the final "3" relates to the interface number from MND 204 to Host H3 201. In this way, a globally unique locator for any host H can be constructed with the globally unique locator of the ER and concatenating the egress LIN for each network. Note that host H3 201 could also be reached using the symbolic address (r,1,3,2) or even (r,1,2,4,3,2).

The symbolic address for a host can be encoded into a binary string similar to an IP address. For example, the locator r of ER 202 can be mapped to a 48 bit Ipv6 prefix, and each LIN in the symbolic address can be mapped to, for example, an 8-bit number. Using the example symbolic address to H3 of (r,2,3,2), three LINs are required to describe the path from the ER 202 to the host H3 201. The total locator bit length is therefore 48+(3×8)=72 bits. This means that 56 of the 128 bits of an Ipv6 address are not used. In fact, with a prefix length of 48 bits and a LIN size of 8 bits, ten LINs can be concatenated within an Ipv6 address.

Each LIN has the form m/n, where m is a numerical value and n is the number of bits, and each LIN may have a separate value for n. Where a host is addressed with such a binary string, when a network receives a packet with a source or destination global locator, the network must determine which part of the global locator is to be parsed. To indicate this information to the network, a pointer is carried in the packet header and is updated at every hop of the packet along the path. A router determines the next hop by matching LINs with the segment of the global locator that is pointed out by the pointer and by the number of bits n associated with each LIN. The value of n is local to each network, and is therefore known by the local network node that parses the locator. A pointer pointing at bit 49 in an IPv6 address, combined with the information that the LIN consists of 8 bits, results in a bit mask for bits 49-56. After parsing these bits, the pointer is incremented by n bits, (i.e. to 57 in this example) by the local network node before the packet is forwarded to the next network.

It will be seen from FIG. 2 that networks A, B, C and D have identical sets of LINs (at least up to LIN 3). A LIN is therefore only unique in the context of a particular network. A globally unique locator can therefore only be constructed when the LINs are concatenated with globally unique locators for an Edge Router.

The above scheme for constructing a globally unique locator works very well when constructing a global locator that describes a path in the direction to a destination host from an Edge Router. However, the system does not work for constructing a globally unique locator that describes the same path in the direction from the source host to the Edge Router. It will be apparent from FIG. 2 that a path may be constructed from any of hosts H1, H2, H3, H4 to the Edge router using the address (r,1,1,1). This locator is parsed right-to-left when forwarding along a specific path from a source host to the Edge Router. However, since this locator is not globally unique, it cannot be used for forwarding from the Edge Router to a destination host. It is apparent from FIG. 2 that this locator only describes a "bottom-up" path, but does not describe a valid "top-down" path from the Edge Router to a host. Similarly, a locator that describes a "top-down" path cannot be used to describe the same path in the reverse direction. A locator that describes a bottom-up path is therefore not globally unique, and cannot be used for forwarding along the same path in the top-down direction. A source host that sends a packet inserts a bottom-up source locator to describe the path from the host to the edge router. It also inserts a top-down destination locator to describe the path from the edge router to the destination host. The problem is that the destination host that receives a packet with a bottom-up source locator cannot use it to return a packet to the source host for the reasons stated above.

SUMMARY

The inventor has realised that prior art methods for constructing a globally unique identifier for an object are limited to "top-down" construction, and has accordingly devised a way of assigning Local Interface Numbers such that a globally unique locator can be used for describing a path both in the "top-down" and in the "bottom-up" direction.

Construction of a globally unique locator for an object is made possible by negotiating a locally unique identifier at each link between networks and network entities on the path to or from the object. The locally unique identifier is used at either end of the link.

In accordance with one aspect of the present invention there is provided a method for use in interconnected communications networks. The method comprises negotiating a locally unique interface identifier between a network entity and a network. The locally unique interface identifier differs from any interface identifier used by either of the network entity and the network. This locally unique interface identifier is used to identify an egress interface from the network entity to the network, and also to identify an egress interface from the network to the network entity. By using the method, when a path to a source or destination host is constructed using the identifier of the egress interface, the path is the same whether it is constructed "top-down" or "bottom-up".

The network entity is preferably selected from any one of a further network, a host, a terminal, an edge router and a proxy node for a non-network object. In the case where the network entity is a non-network object, the non-network object may be selected from any of a physical object that can register with a network node, a human being, a data file, a sensor, a vehicle, a communication session, an application instance, and a physical location.

Optionally, the locally unique interface identifier is selected from a Local Interface Number and a local link ID.

The method optionally further comprises generating a unique locator for a destination or source network entity by concatenating elements from each of a plurality of negotiated locally unique interface identifiers between network entities on a path between the destination or source network entity and a core network. Because the interface identifier between each pair of adjacent network entities on the path is the same, the locator can be used to describe a path from the source or destination network entity to the core network, and from the core network to the source or destination network entity.

The method is optionally extended to assist in preventing a Denial of Service attack. When a Denial of Service attack is detected, a common interface identifier between the network and the network entity is renegotiated such that at least one locally unique interface identifier between network entities on a path between the destination or source network entity and a core network is altered, and a new unique locator is generated for the destination or source network entity using the new interface identifiers, including the at least one altered locally unique interface identifier.

According to a second aspect of the invention, there is provided a method of generating a unique locator for a destination or source network entity. The method comprises concatenating elements derived from a plurality of locally unique interface identifiers from network entities on a path between the destination or source network entity and a core network. A locally unique interface identifier from a network entity to an other network entity is identical to a locally unique interface identifier from the other network entity to the network entity. In this way, the same locator can be used to describe a path from the source or destination network entity to the core network and from the core network to the source or destination network entity.

The network entity is preferably selected from any one of a further network, a host, a terminal, an edge router and a proxy node for a non-network object. In the case where the network entity is a non-network object, the non-network object may be selected from any of a physical object that can register with a network node, a human being, a data file, a sensor, a vehicle, a communication session, an application instance, and a physical location.

Optionally, the locally unique interface identifier is selected from a Local Interface Number and a local link ID.

It is preferred that the unique locator is in the form of an IPv6 address, although it is possible that other types of locator may be constructed.

According to a third aspect of the invention, there is provided a method of generating a unique locator for a destination or source entity attached to a communications network. The method comprises concatenating elements derived from a plurality of pairs of interface identifiers. The first interface identifier of a pair of interface identifiers identifies an egress interface from a network entity to a further network entity, and the second interface identifier of the pair identifying an egress interface from the further network entity to the network entity. In this way a unique locator can be generated that can be used to define a path from the source or destination network entity to a core network, and from the core network to the source or destination network entity, without needing to negotiate locally unique interface identifiers between networks and network entities on the path.

According to a fourth aspect of the invention, there is provided a node for use in interconnected communications networks. The node comprises a transmitter for sending information to a further node connected to the node, a receiver for receiving information from the further node, and means for negotiating a common locally unique interface identifier to be used by the node when communicating with the further node and by the further node when communicating with the node. By "common", it is meant that the locally unique identifier is used to identify an egress interface from the node to the further node, and from the further node to the node. Optionally, the locally unique interface identifier is selected from a Local Interface Number and a local link ID.

The node can optionally be used to prevent Denial of Service attacks, by providing the node with means for detecting a Denial of Service attack and means for, as a result of the detection, renegotiating a different common locally unique interface identifier to be used by the node when communicating with the further node and by the further node when communicating with the node.

Optionally, the node further comprises means for generating a unique locator for a source or destination network entity by concatenating elements derived from each of a plurality of negotiated locally unique identifiers between network entities on a path between the destination or source network entity and a core network. In this way, the negotiated identifiers can be used to generate a globally unique locator describing a path between the source or destination node and a core network in either direction.

According to a fifth aspect of the invention, there is provided a node for use in interconnected communications networks, the node comprising a processor for concatenating elements derived from a plurality of locally unique interface identifiers from network entities on a path between a destination or source network entity and a core network, each interface identifier from a network entity to an other network entity being the same as an interface identifier from the other network entity to the network entity, the concatenated elements being used to derive a globally unique locator for the destination or source network entity. Optionally, the network entity and the other network entity are selected from any of a network, a host, a terminal, an edge router and a proxy node for a non-network object, and the globally unique locator may be an IPv6 address.

According to a sixth aspect of the invention, there is provided a node for use in interconnected communications networks. The node comprises a processor for generating a unique locator for a source or destination network entity attached to the network, by concatenating elements derived from a plurality of pairs of interface identifiers. The first interface identifier of a pair of interface identifiers identifies an egress interface from a network entity on a path between the source or destination entity to a core network to a further network entity on the path. The second interface identifier of the pair identifies an egress interface from the further network entity to the network entity. This node can therefore generate a unique locator for a source or destination network entity that can be used in either direction between the source or destination network entity and a core network, which does not rely on negotiations between network and network entities on the path between the source or destination network entity and the core network.

The node may further comprise means for detecting a Denial of Service attack, means for, as a result of the detection, changing at least one interface identifier between network entities on the path; and means for generating a new unique locator for the source or destination network entity by concatenating elements derived from a plurality of pairs of interface identifiers between network entities, the plurality of pairs of interface identifiers including the changed identifier.

Any of the methods described above, optionally further comprise providing a set of globally-reachable Attachment Registers, where at least some of the networks and hosts each has a corresponding Attachment Register, and storing information in the Attachment registers that establishes one or more logical links between the attachment registers. The logical links between certain ones of the attachment registers are useable to perform one or more network communication functions.

DETAILED DESCRIPTION

The following description sets forth specific details, such as particular embodiments, procedures, techniques, etc. for purposes of explanation and not limitation. It will be appreciated by one skilled in the art that other embodiments may be employed apart from these specific details. For example, although the following description is facilitated using a non-limiting example application to mobile communication networks configured in a tree type network topology, this technology has application to any communications network application. In some instances, detailed descriptions of well known methods, interfaces, circuits, and devices are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

Figure 3:
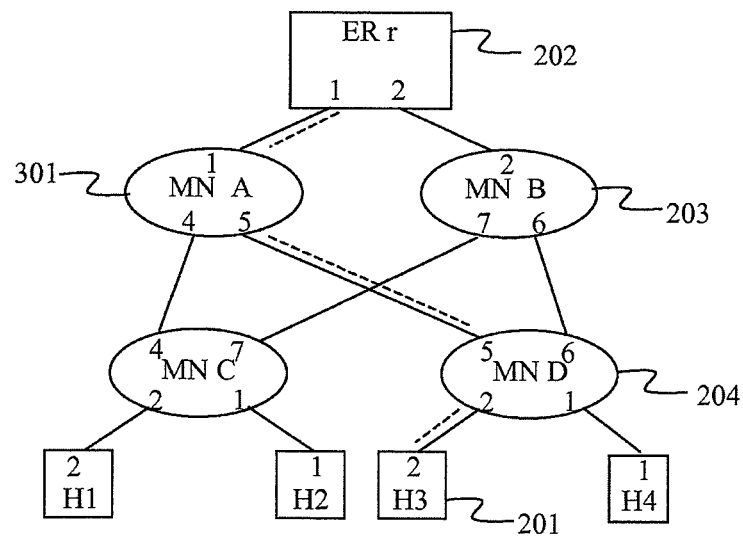
FIG. 3 illustrates schematically an example of networks having negotiated interface numbers according to an embodiment of the invention.

Referring to FIG. 3, there is illustrated schematically an example of networks having negotiated interface numbers according to an embodiment of the invention. In this example, the Mobile Networks may move and attach to other networks. An example of such a network is a network associated with a moving train. As the train moves, so does the network, and it attaches to other networks as it moves to maintain connectivity.

Using prior art methods, a globally unique locator can be generated that describes a path from an Edge router to a destination host, but not one that describes a path from a source host to the Edge Router. This is because a source locator generated using prior art methods may be valid for several source hosts. This means that a destination host that receives this type of source locator cannot use it to return a packet to the source.

In the example of FIG. 3, MN D 204 moves and attaches to MN B 203. When this attachment occurs, it negotiates an interface number for both ends of the link between MN B 203 and MN D 204. This interface number must be locally unique to both networks MN B 203 and MN D 204. In this example, the negotiation has resulted in interface number 6. Similarly, when MN D 204 attaches to Mobile Network A (MN A) 301, networks MN D 204 and MN A 301 negotiate an interface number for both ends of the link between MN D 204 and MN A 301. In this example, the negotiation has resulted in interface number 5. When each network moves and attaches to a new network, the two networks negotiate a locally unique interface number for each end of the link between the two networks.

A similar negotiation must take place when a host attaches to a network, and so, for example, H3 201 is attached to MN D 204, and the interface number at the link between the host H3 201 and MN D 204 is the same. In this example, the interface number between H3 201 and MN D 204 is 2.

It is apparent from FIG. 3 that a globally unique locator that is constructed to describe a "top-down" path can also be used to describe the same path in the "bottom-up" direction. A globally unique locator is constructed using firstly the egress interface number of the host, and then proceeds with the egress interface numbers of each Mobile network on the path to the Edge Router 202. For example, a globally unique locator for H3 201 constructed along the dashed line illustrated in FIG. 3 can be symbolised by (r,1,5,2) regardless of whether the globally unique locator describes the path in the "top down" or in the "bottom up" direction.

Figure 4:
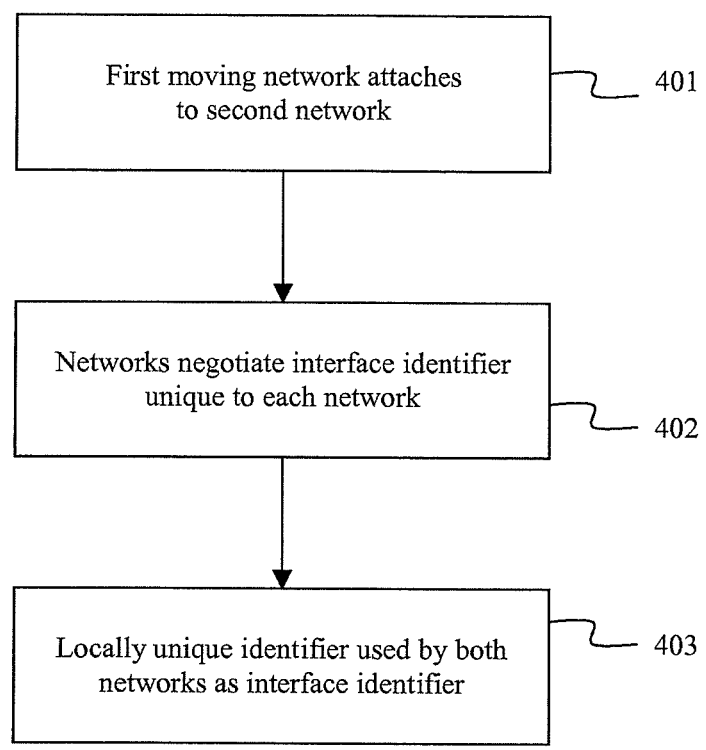
FIG. 4 is a flow chart illustrated the basic steps of an embodiment of the invention.

The basic steps of this embodiment of the invention are illustrated in the flow chart of FIG. 4. When a first moving network attaches 401 to a second network, the two networks negotiate 402 an interface identifier that is unique to each network. This locally unique identifier is used 403 by both networks as their interface identifier. Whilst this Figure illustrates the invention with respect to two networks, it will be apparent that it also applies to, for example, a network and a host, as a network and a host must also share a locally unique identifier if a globally unique locator is to be constructed for the host. It also applies to a network and an Edge Router for the same reasons.

Figure 5:
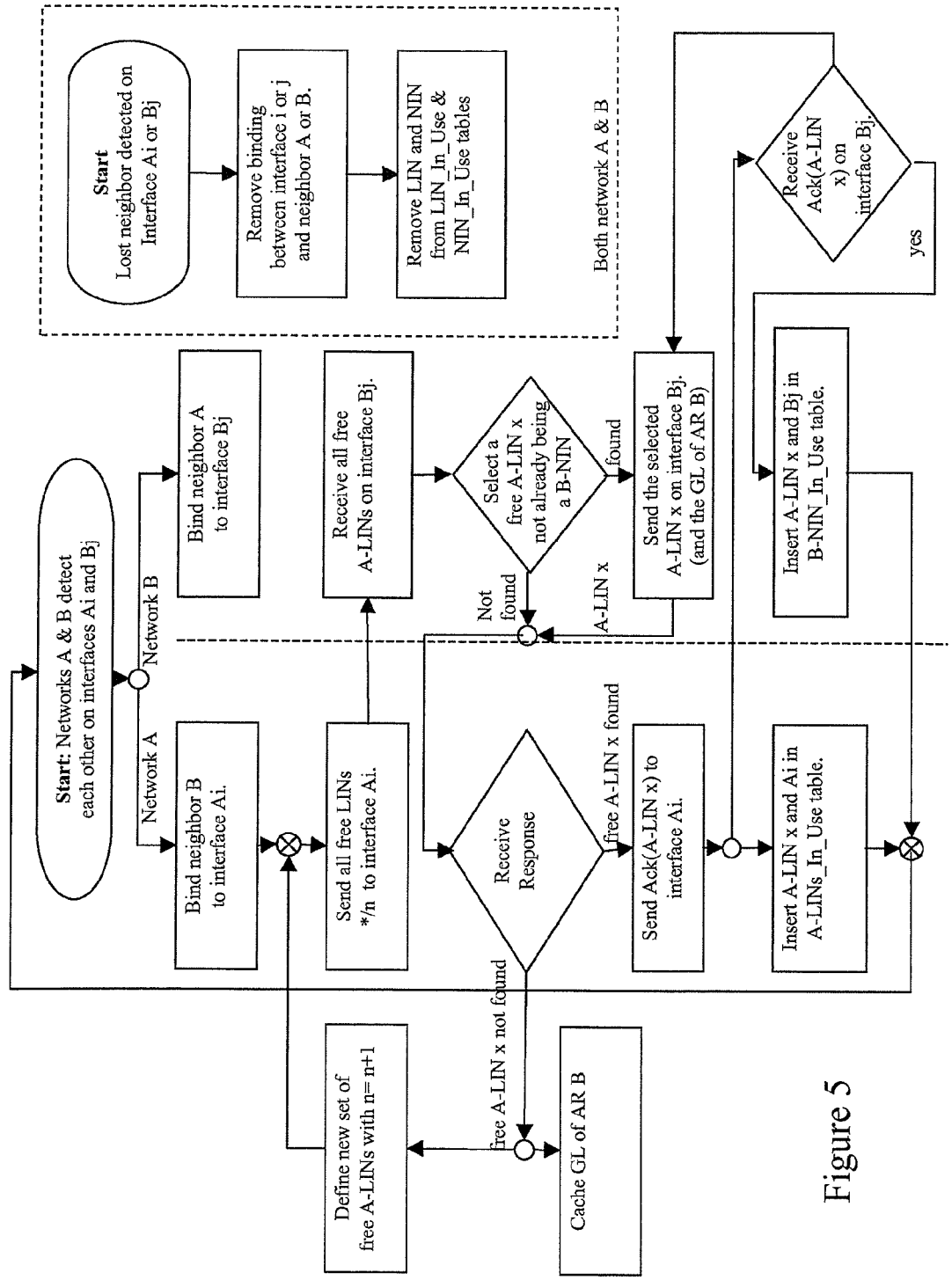
FIG. 5 is a flow chart illustrating negotiation of a Local Interface Number between neighbouring networks.

The negotiation procedure to determine a LIN when a moving network attaches to another network is illustrated in the flow chart of FIG. 5. In this example, moving networks A and B attach to each other and a negotiation for a common LIN takes place between networks A and B. For the sake of clarity, FIG. 5 only illustrates the negotiation procedure from network A to network B, and does not illustrate the corresponding negotiation process from network B to network A. When negotiating a common LIN at the egress of each of networks A and B, a Neighbour Interface Number (NIN) is assigned to network B by network B as illustrated in FIG. 5. The NIN is the interface number of the neighbour network at the remote end of the link. After a successful negotiation, the LIN at the near end of the link is equal to the NIN. The negotiation procedure illustrated in FIG. 5 starts with network A sending to network B a list of LINs not already in use by network A. Network B checks whether any of these LINs are already being used by network B. If a common LIN is found that is not being used by either of network A and B, it can serve as a common LIN at both ends of a link interconnecting the two networks, since it will be locally unique to both networks. Network B sends the value of this LIN to network A. On the other hand, if network B cannot find such a LIN, it sends a negative acknowledgment to network A informing network A that no such LIN can be found. Network A then increases its number of available LINs by assigning more bits to the bit fields defining a LIN. The procedure is then iterated until a common LIN not already in use is found.

The negotiation mechanism is based on a centralized negotiation function and link ID registry per moving network. In an alternative embodiment, these functions are handled by an Attachment Register associated with the moving network.

The flowchart illustrates a basic negotiation procedure when a network or host attaches to another network. However, in a cold start situation where all networks negotiate concurrently, certain precautions are needed to avoid a situation where negotiation stalls in a dead-lock state. This could arise where, for example, the response of network B to network A depends on the response of network A to network B. This could happen if both networks assume the role of network A in the flowchart. A procedure is required to determine, at the time of attachment, which of the two neighbours takes the role of network A (initiator), and which takes the role of network B (responder). This is done using any well-known technique for this type of problem. One such technique is for each network to generate a random number, and the network with the lowest number takes the role of network A. Note that the role of initiator or responder is defined for each link separately. A network can thus be the initiator for one link, and responder for another link.

Similarly, the response time from network B to network A could be high if the response from B depends on another response from network X to network B, which in turn depends on a response from network Y to network X, etc. To avoid such chains of dependencies, a network that receives a query for an interface number in its role as network B on a specific link revokes any outstanding query in its role as network A on other links. This enables the networks to respond immediately to a query, without having to wait for the response in terms of busy interface numbers that may result from the outstanding queries. A revoked query is then re-sent after the response on the previous query has been acknowledged.

The negotiation procedure shown in the flowchart of FIG. 3 must be performed sequentially on each of the links to a neighbour network, so available interface numbers are announced to each neighbour at a time. If the negotiations were to be performed with several networks in parallel, there is a risk that two neighbour networks would respond with the same interface number.

Figure 6:
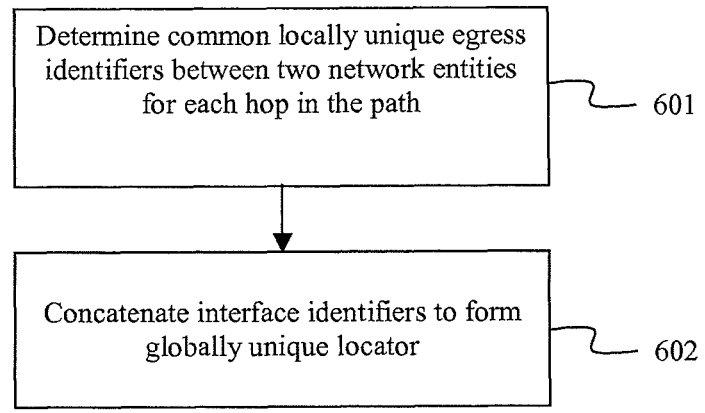
FIG. 6 is a flow chart illustrated the basic steps of a further embodiment of the invention.

Once a common LIN has been negotiated 601 between all of the neighbouring networks and network entities in the path between the core network and the destination host, a global locator for the destination host can be constructed as illustrated in FIG. 6, by concatenating 602 the common LINs (or elements from the common LINs) into a globally unique locator to the destination host.

According to an alternative embodiment of the invention, a globally unique locator could be constructed on the basis of concatenated link IDs rather than concatenated egress LINs. In this case, the procedure of negotiating the same LIN at both ends of a neighbour to neighbour link that is locally unique to both networks is similar to the procedure of negotiating a link ID that is unique for both neighbour networks. The identical interface numbers at each end of a link may be used as a link ID. A link ID is either globally or locally unique. However, a globally unique link IDs requires an excessive number of bits per ID, whereas a locally unique link ID negotiated using the mechanism described above has the advantage of requiring less overhead in terms of bits per ID.

Figure 1:
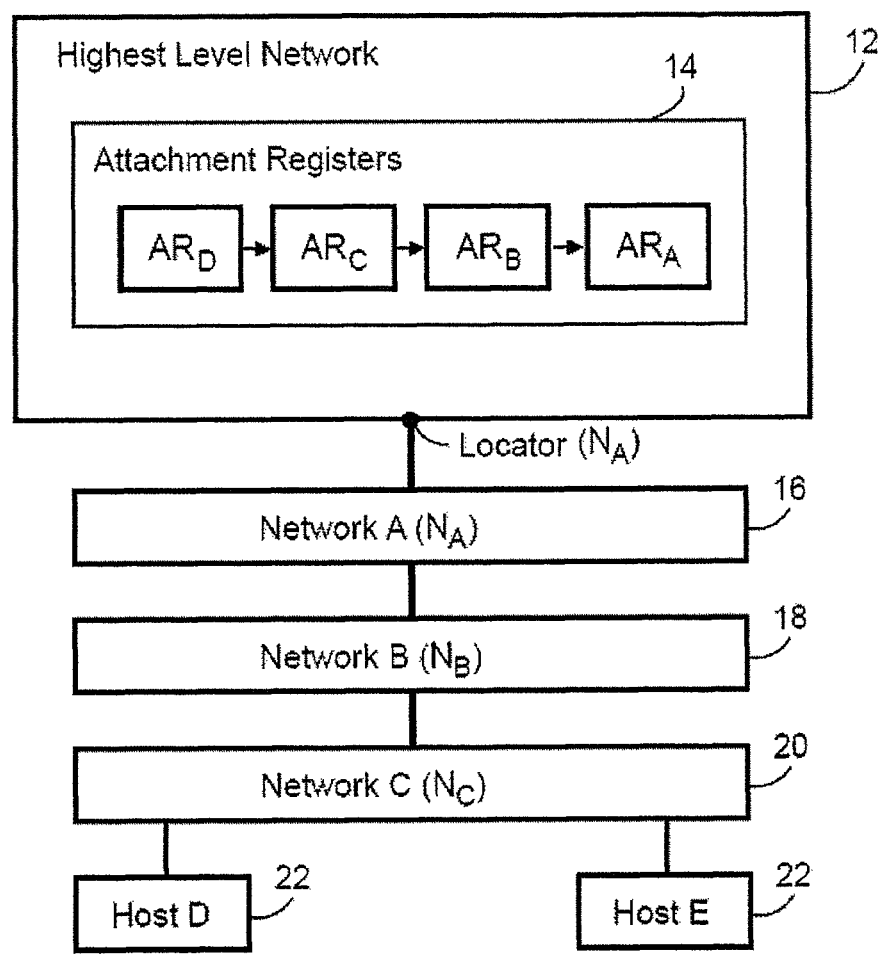
FIG. 1 is a function block diagram of an example internetwork of networks and hosts in which a set of globally-reachable attachment registers is used to perform one or more network communication functions.
Figure 2:
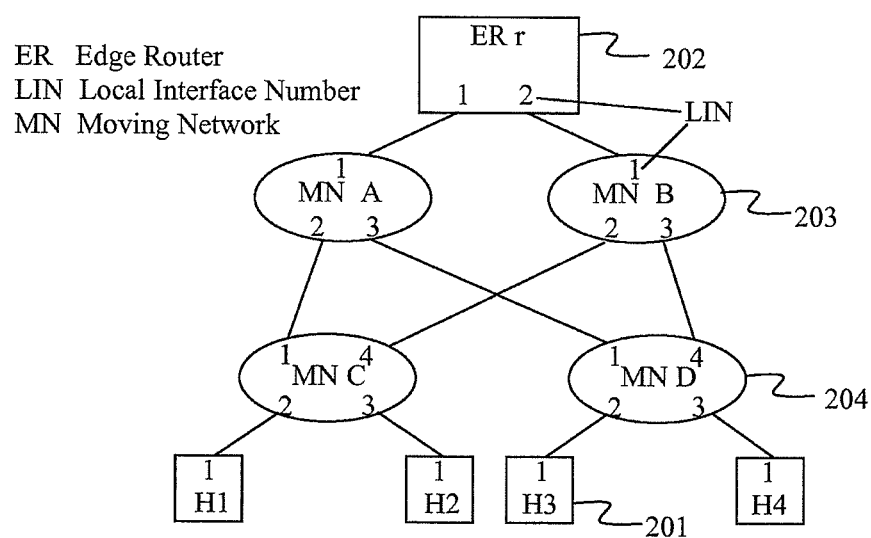
FIG. 2 illustrates schematically an example of networks having locally unique interface numbers between each network.

In an alternative embodiment, a locator that describes both the "top-down" and the "bottom-up" path is constructed directly from the interface numbers at both ends of each link shown in FIG. 2. For example, the locator of Host 3 then includes the interface numbers at each end of each link that is traversed from the core to the host, namely (r, 1.1, 3.1, 2.1). When forwarding from the core towards the host, the first interface number in each dot-separated pair of interface numbers is used, i.e. (r, 1, 3, 2). On the other hand, when forwarding from the host towards the core, the second interface number in each dot-separated pair of interface numbers is used, i.e. (r, 1, 1, 1). The advantage of this approach is that identical interface numbers at each end of a link (link IDs) do not need to be negotiated. The disadvantage is that twice the number of bits are needed in the locator compared to when the interface numbers are negotiated. This is because the interface numbers at both ends of each link are used.

Figure 7:
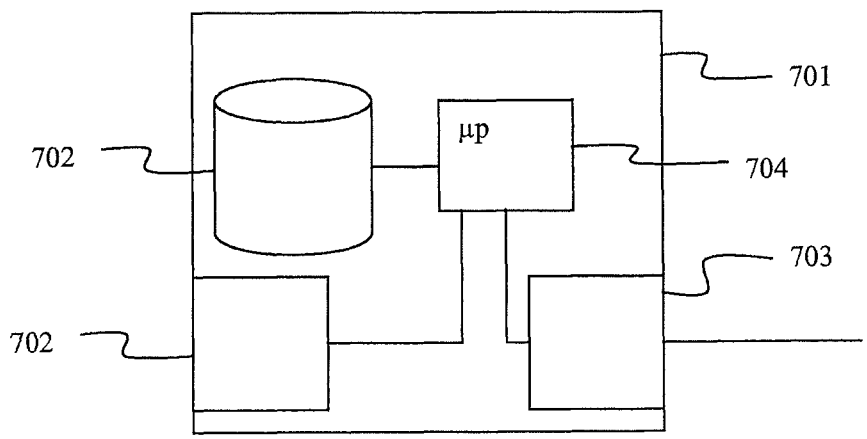
FIG. 7 illustrates schematically a network node according to an embodiment of the invention.

FIG. 7 illustrates schematically a network node in accordance with an embodiment of the invention. The node 701 comprises a receiver 702 and a transmitter 703, and a processor 704. It may also have a database 705 operatively connected to the processor 704. The processor 704 is use to negotiate a locally unique LIN with a neighbour network or network entity. The processor may alternatively or additionally be used to concatenate LINs in the path from the core network to the destination host (or from the destination host to the core network) to form a globally unique locator for the host, such as in IPv6 address.

In a further embodiment of the invention, the globally unique locator is not limited to providing a location to a host, but may be a location for other objects such as passive components, human beings, data files and so on. It is quite common that mobile objects travel within or in association with other mobile objects. For example, a person may travel in association with a mobile telephone and a laptop computer that may be associated with a personal area network that may in turn be associated with a vehicular network (e.g. on a train). A globally unique locator may be provided for the person in addition to the mobile telephone and the laptop. In this case, the person can be contacted directly using either their laptop or their mobile telephone according to their preference.

Any object can be traceable if it has a globally unique locator. Examples of such objects include the following:
- a network such as a PAN or VAN;
- a host or terminal;
- a physical object that can register with a network node using e.g. an RFID tag, a PIN code or a bar code;
- a human being;
- a data file;
- a sensor;
- a vehicle;
- a communication session such as a telephone call;
- an application instance; or
- a physical location such as a hotel room or a conference room.

Such objects need not have network interfaces of their own. In this case they cannot initiate a registration with an attachment register, so a network entity must act as a proxy for the object. For example, a human being may "attach" to a network using a mobile telephone as a proxy.

In a further embodiment of the invention, the locator construction procedure is used for protection against denial of service (DoS) attacks. When a DoS attack is detected on a specific link, the interfaces at each end of the link are assigned a new number according to the negotiation procedure described above. Furthermore, packet forwarding based on the old interface number of the link under attack is inhibited. As a consequence, momentarily no traffic will be forwarded on the link, except such signaling packets that are routed along the default path to the core.

The loss of end/to/end connectivity is detected by the end systems, which request the construction of a new locator based on the new interface number. The Attachment Register of the destination end system verifies the credentials of the source end system making the request for the construction of a new global locator for the destination end system. If the credentials are accepted, a new locator is constructed and sent to the source end system. The communication between the end systems can now be resumed using the new locator. The disruption of the communication between two end systems has the same duration as for any other topology change that requires the construction of a new locator, e.g. a regular mobility event.

Malicious end systems causing the DoS attack fail the verification procedure when requesting the construction of a new locator. These end systems are therefore not able to resume sending traffic across the interfaces with the new number, and the DoS traffic is therefore blocked. A malicious end system typically learns a valid global locator by eavesdropping on the network traffic, but does not have the credentials to request the construction of a new locator.

An advantage of this mechanism for denial of service protection is that it is highly scalable since it does not require the introduction of firewalls or other filters that require a state machine per packet flow.

Although various embodiments have been shown and described in detail, the claims are not limited to any particular embodiment or example. None of the above description should be read as implying that any particular element, step, range, or function is essential such that it must be included in the claims' scope. The scope of patented subject matter is defined by the claims.

The invention claimed is:

1. A method of generating a unique locator for a destination or source entity attached to a communications network, the method comprising concatenating elements derived from a plurality of pairs of interface identifiers, a first interface identifier of a pair of interface identifiers identifying an egress interface from a network entity to a further network entity, a second interface identifier of the pair identifying an egress interface from the further network entity to the network entity, and wherein the unique locator defines a path from the destination or source entity to a core network and a path from the core network to the destination or source entity, the network entity is selected from any one of a further network, a host, a terminal, an edge router and a proxy node for a non-network object, and the non-network object is selected from any of a physical object that can register with a network node, a human being, a data file, a sensor, a vehicle, a communication session, an application instance, and a physical location.

2. The method for use in interconnected communications networks according to claim 1, wherein the first and the second interface identifiers are selected from a Local Interface Number and a local link ID.

3. A node for use in interconnected communications networks, the node comprising a processor for generating a unique locator for a source or destination network entity attached to the network by concatenating elements derived from a plurality of pairs of interface identifiers,
wherein a first interface identifier of a pair of interface identifiers identifies an egress interface from a network entity on a path between the source or destination network entity to a core network to a further network entity on the path;
a second interface identifier of the pair identifies an egress interface from the further network entity to the network entity; and
wherein the unique locator defines a path from the destination or source entity to a core network and a path from the core network to the destination or source entity, the network entity is selected from any one of a further network, a host, a terminal, an edge router and a proxy node for a non-network object, and the non-network object is selected from any of a physical object that can register with a network node, a human being, a data file, a sensor, a vehicle, a communication session, an application instance, and a physical location.

4. The node for use in interconnected communications networks according to claim 3, further comprising:
means for detecting a Denial of Service attack
means for, as a result of the detection, changing at least one interface identifier between network entities on the path; and
means for generating a new unique locator for the source or destination network entity by concatenating elements derived from a plurality of pairs of interface identifiers between network entities, the plurality of pairs of interface identifiers including the changed identifier.

5. The node for use in interconnected communications networks according to claim 3, wherein the first and the second interface identifiers are selected from a Local Interface Number and a local link ID.

* * * * *

UNITED STATES PATENT AND TRADEMARK OFFICE
CERTIFICATE OF CORRECTION

| | |
|---|---|
| PATENT NO. | : 8,473,616 B2 |
| APPLICATION NO. | : 12/679184 |
| DATED | : June 25, 2013 |
| INVENTOR(S) | : Eriksson |

It is certified that error appears in the above-identified patent and that said Letters Patent is hereby corrected as shown below:

On Title Page 2, item (56), under "OTHER PUBLICATIONS" in Column 2, Line 1, delete "coresponding" and insert -- corresponding --, therefor.

In the Drawings

In Fig. 2, Sheet 2 of 5, in Line 3, delete "MN Moving Network" and insert -- MN Mobile Network -- therefor.

In Fig. 7, Sheet 5 of 5, delete " 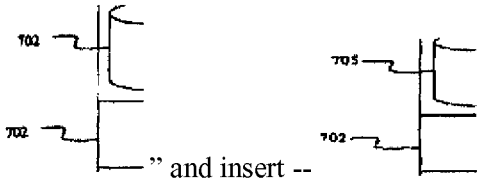 " and insert -- ---, therefor.

Signed and Sealed this
Fifteenth Day of July, 2014

Michelle K. Lee
*Deputy Director of the United States Patent and Trademark Office*